(12) United States Patent
Papallo, Jr. et al.

(10) Patent No.: US 6,721,154 B2
(45) Date of Patent: Apr. 13, 2004

(54) APPARATUS AND METHOD FOR REPRESENTING PROTECTION DEVICE TRIP RESPONSE

(75) Inventors: Thomas F. Papallo, Jr., Farmington, CT (US); Ahmed Elasser, Lantham, NY (US); Richard L. Hein, Weatogue, CT (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/248,062

(22) Filed: Dec. 13, 2002

(65) Prior Publication Data

US 2003/0133244 A1 Jul. 17, 2003

Related U.S. Application Data

(63) Continuation of application No. 09/650,528, filed on Aug. 30, 2000, now Pat. No. 6,535,370.
(60) Provisional application No. 60/190,314, filed on Mar. 17, 2000.

(51) Int. Cl.[7] .............................. H01H 73/00; H02H 3/00
(52) U.S. Cl. .......................................... 361/115; 361/96
(58) Field of Search ........................................ 361/115

(56) References Cited

U.S. PATENT DOCUMENTS

| | | | |
|---|---|---|---|
| 4,245,318 A | 1/1981 | Eckart et al. | 364/481 |
| 4,476,511 A | 10/1984 | Saletta et al. | 361/96 |
| 4,620,156 A | 10/1986 | Alvin et al. | 324/424 |
| 4,631,622 A | 12/1986 | Howell | 361/45 |
| 5,402,299 A | 3/1995 | Bellei | 361/63 |
| 5,668,691 A | 9/1997 | Ito et al. | 361/13 |
| 5,872,722 A | 2/1999 | Oravetz et al. | 364/528.27 |
| 5,905,616 A | 5/1999 | Lyke | 361/64 |
| 5,969,921 A | 10/1999 | Wafer et al. | 361/45 |
| 6,215,379 B1 | 4/2001 | O'Keefe et al. | 335/35 |
| 6,535,370 B1 * | 3/2003 | Papallo, Jr. et al. | 361/115 |

OTHER PUBLICATIONS

R.H. Kaufman; "The Magic of 12t"; IEEE Transaction on Industry and General Applications; vol. IGA–2 No. 5; Sep./Oct. 1966.

Merlin Gerlin; "LV Circuit Breaker and Switch Disconnectors"; Compact Complementary Technical Information Regarding Current Limiting; Schneider Electric SA; Mar. 1995; AC0440E.

* cited by examiner

*Primary Examiner*—Pia Tibbits
(74) *Attorney, Agent, or Firm*—Cantor Colburn LLP

(57) ABSTRACT

A method and apparatus generates an enhanced trip time curve capable of capturing both the non-sinusoidal energy and series effects. Relevant data including time, current, and energy is plotted on a three-dimensional set of axes. The resultant three-dimensional representation is useful for representing trip times for a protection device accounting for energy effects, and for determining selectivity in a multi-tier electrical distribution system.

16 Claims, 11 Drawing Sheets

APPARATUS AND METHOD FOR REPRESENTING PROTECTION DEVICE TRIP RESPONSE

CROSS REFERENCE TO RELATED APPLICATIONS

This application is a continuation application of U.S. Ser. No. 09/650,528 filed Aug. 30, 2000, now U.S. Pat. No. 6,535,370, which claims the benefit of the Provisional Application Serial No. 60/190,314 filed Mar. 17, 2000, which is hereby incorporated by reference.

BACKGROUND OF INVENTION

The present invention relates to protection devices, and more particularly to an apparatus and method for representing protection device trip response.

The actual tripping of many protection devices, including some types of circuit breakers, overload relays and fuses, is generally dependent on the magnitude of the current, time, and the energy.

Figure 1:
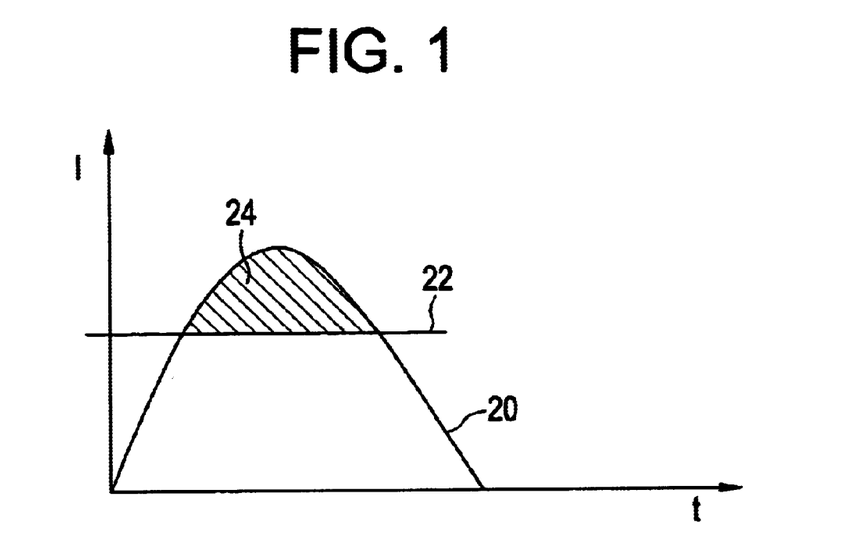
FIG. 1 is a current wave-form demonstrating sinusoidal behavior.

Referring now to FIG. 1, a current I versus a time t is shown for a particular protection device wherein a wave-form 20 is generally sinusoidal. The current must reach a particular threshold 22 for the device to begin responding, and then there must be enough energy to drive the tripping mechanism (e.g., magnets, bi-metals, melting conductors, blow-open contact arms, summing electronic trip unit elements, etc.) to complete the trip action. A quantitative representative value for the energy is expressed as $I^2t$, which is an integral function shown in FIG. 1 as the area of a region 24 under wave-form 20 and above threshold 22.

Figure 2:
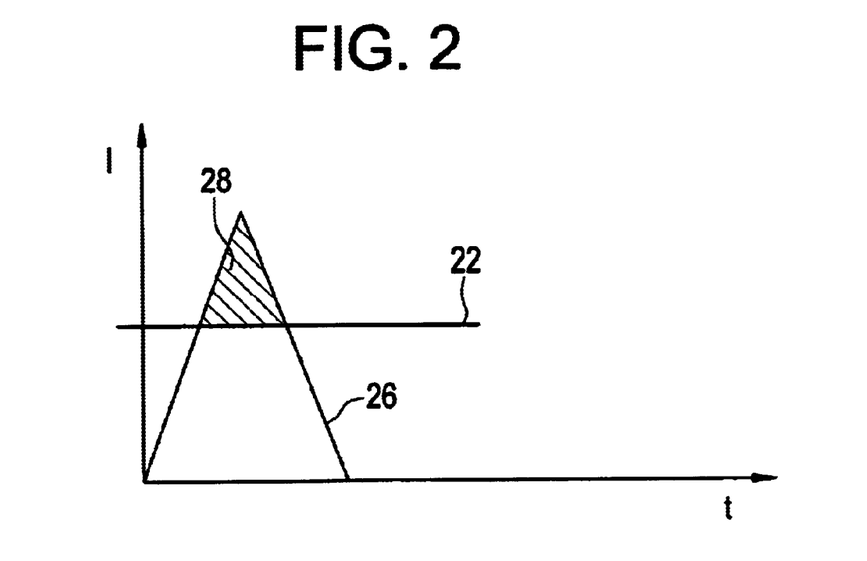
FIG. 2 is a current wave-form demonstrating non-sinusoidal behavior.

The energies (and the corresponding quantitative representative values) become particularly important in certain high current transient conditions because the wave-forms can be non-sinusoidal thereby resulting in a larger or smaller energy region. For example, and referring now to FIG. 2, current I versus t time for the protection device represented in FIG. 1 is shown wherein a wave-form 26 is non-sinusoidal. The threshold current 22 is generally the same for the particular protection device. However, a region 28 can be of a smaller area than region 24, such that the energy represented by region 28 is insufficient to drive the tripping mechanism.

Figure 3:
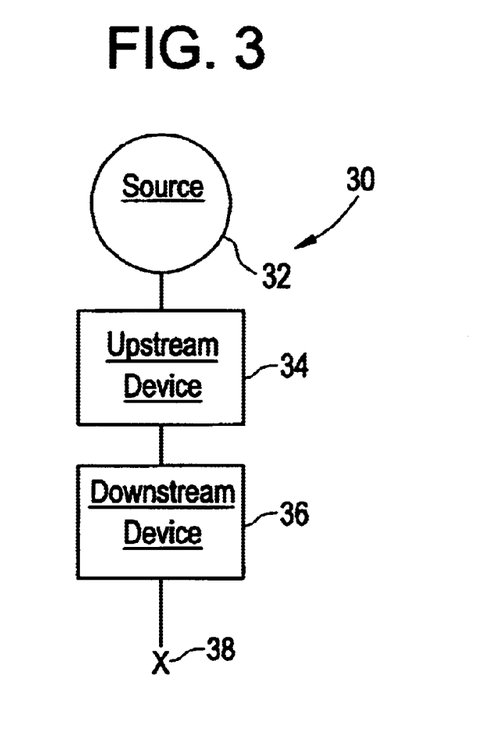
FIG. 3 is a schematic of a multi-tier electrical distribution system.

A plurality of protection devices in series is used to provide system selectivity. In general, a selective system is one in which the device or devices nearest to the fault trip with limited disruption of upstream protection devices. A series combination of protection devices is shown schematically in FIG. 3. FIG. 3 generally shows a two tier selective system 30. Selective system 30 comprises a source 32, an upstream protection device 34, and a downstream protection device 36 coupled to a load 38. Any number of additional downstream protection devices with corresponding loads may be included in system 30.

Figure 4:
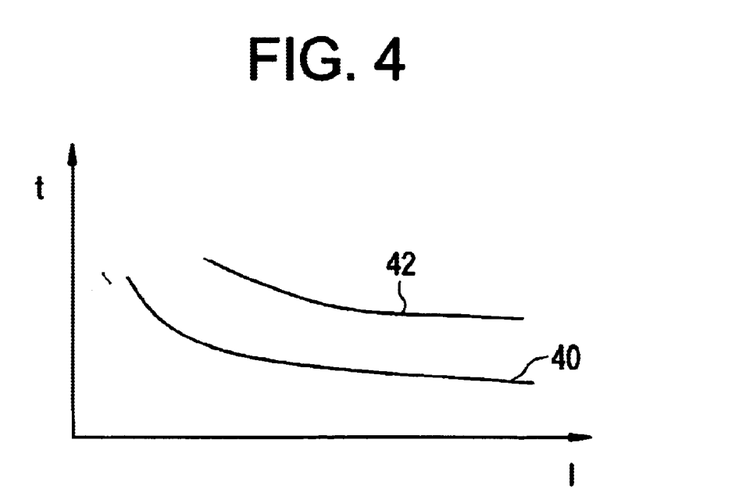
FIG. 4 shows trip time curves for a device within different electrical distribution systems.

The let-through and trip time may be influenced by the series combination, as shown in FIG. 4. More particularly, trip curve 40 represents the behavior of a particular device used alone, whereas trip curve 42 represents the behavior of the same device employed as upstream protection device 34 with a corresponding downstream device 26 in series therewith.

It would, therefore, be desirable to provide a robust method and apparatus for analyzing protection devices.

It would also be desirable to provide a method and apparatus for demonstrating selectivity.

SUMMARY OF INVENTION

A method and apparatus generates an enhanced trip time curve capable of capturing both the non-sinusoidal energy and series effects.

In one embodiment, a method for representing trip times for a protection device is provided. The method includes plotting a time on a y-axis as a function of current on an x-axis and an energy representation on a z-axis. In a preferred embodiment of the method for representing trip times for a protection device, a quantitative representative value for the energy is expressed as $I^2t$.

In another embodiment, a method for representing on times for a protection device is provided. The method includes plotting a time on a y-axis as a function of a peak let-through current value on an x-axis and a corresponding energy on a z-axis. In a preferred embodiment, a peak let-through current value is converted to a mapping current value by employing a function using the peak let-through current as the independent variable.

In a further embodiment, a method for determining selectivity in a multi-tier electrical distribution system is provided. The method includes plotting a trip time on a y-axis as a function of current on an x-axis and an energy representation on a z-axis, and further, plotting a clearing time on the y-axis as a function of a peak let-through current value on the x-axis and a corresponding energy on the z-axis. In a preferred embodiment, the a peak let-through current value is converted to a mapping current value by employing a function using the peak let-through current as the independent variable. An intersection between the trip response surface and the let-through surface represents selectivity limit.

In a further embodiment, the current and energy values are from software generated data, empirical data from laboratory experiments, empirical data from actual operations, theoretical data, hypothetical data, or any combination of the aforementioned data types.

BRIEF DESCRIPTION OF DRAWINGS

Referring now to the drawings, which are meant to be exemplary and not limiting, and wherein like elements are numbered alike in the several Figures.

DETAILED DESCRIPTION

A method and apparatus generates an enhanced trip time curve capable of capturing the non-sinusoidal energy effects. In one embodiment, a three-dimensional device trip time curve showing trip times at certain current levels and associated energies is created and employed.

In another embodiment, a three-dimensional let-through representation is generated, representing the peak current and the associated on-time and let-through energy level for the protection device. In a further embodiment, the peak current is converted to a mapping current, representing the available source current which results in the associated peak current.

In one embodiment, a method for representing trip times for a protection device is provided. The method includes plotting a series of trip times on a y-axis as a function of a series of current values on an x-axis and a series of energy values on a z-axis. In a preferred embodiment of the method for representing trip times for a protection device, a series of quantitative representative values for the energy is expressed as $I^2t$.

In another embodiment, a method for representing clearing times for a protection device is provided. The method includes plotting a series of time values on a y-axis as a function of a series of peak let-through current values on an x-axis and a corresponding series of energy values on a z-axis. In a preferred embodiment, the a peak let-through current value is converted to a mapping current value by employing a function having the peak let-through current as the independent variable.

In a further embodiment, a method for determining selectivity in a multi-tier electrical distribution system is provided. Selectivity, also commonly referred to as coordination and discrimination, is the ability of an electrical distribution system to prevent current flow to downstream loads with protection from a downstream device (e.g., as circuit breaker) while maintaining current flow through an upstream device and other loads associated with the upstream device. The method includes plotting a series of trip time values on a y-axis as a function of a series of current values on an x-axis and a series of energy values on a z-axis, and further, plotting a series clearing time values on the y-axis as a function of a series peak current let-through values on the x-axis and a corresponding series of energy values on the z-axis. In a preferred embodiment, the series of peak let-through current value is converted to a series of mapping current values by employing a function having the peak let-through current as the independent variable. An intersection between the trip response surface and the let-through surface represents selectivity limitation.

In another embodiment, series effects of upstream device (s) are accounted for in the downstream let-through curve.

The generated curves can be used to efficiently and effectively demonstrate selectivity within a multi-tier electrical distribution system.

Figure 5:
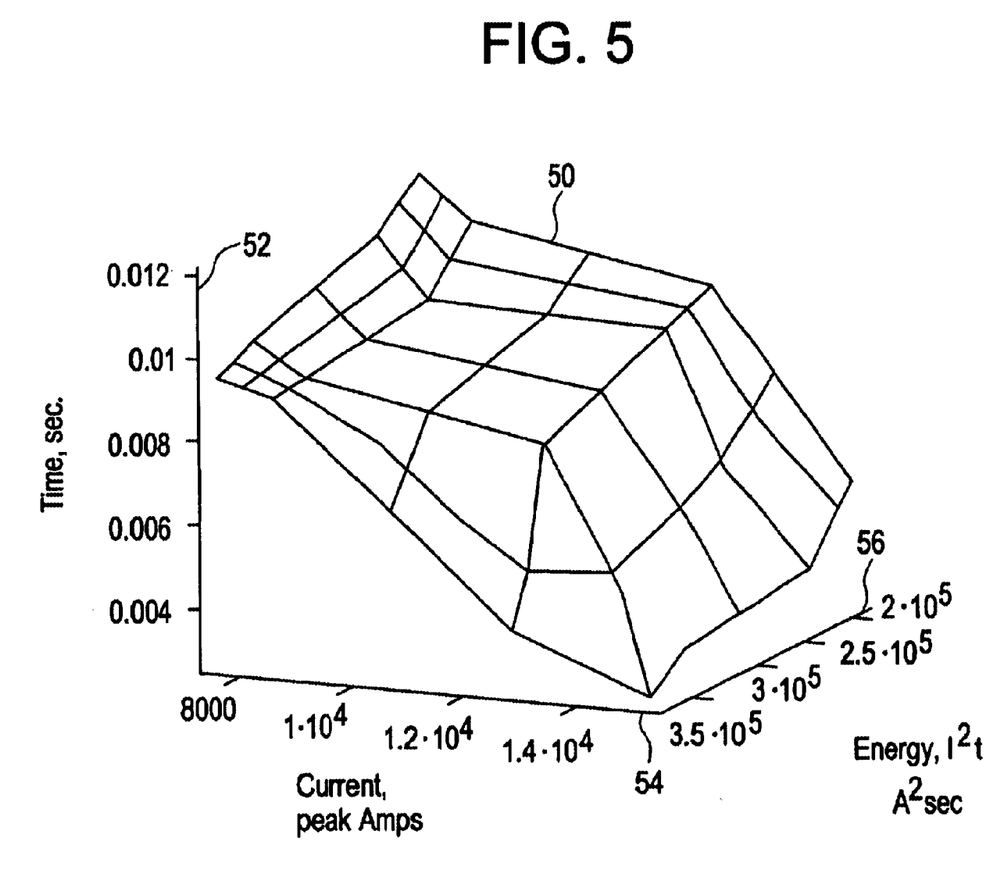
FIG. 5 is a 3-dimensional trip response surface according to one embodiment.

Referring now to FIG. 5, a 3-dimensional trip response surface 50 yields the trip time 52 (y-axis) at which a protection device such as upstream device 34 will commit to tripping -as a function of both the maximum instantaneous current that device 34 will see , peak current 54 expressed in Amperes (x-axis), and energy 56, represented as $I^2t$ and expressed in Amperes$^2$·seconds (z-axis), as the device actually responds.

The surface 50, and other surfaces generated herein, can be efficiently generated with a computer software package, including but not limited to various versions of MathCad, commercially available from MathSoft Inc., Cambridge, Mass.

The data for generating trip response surface 50 and all other surfaces and plots described herein can be obtained from any of a variety of sources, including standard industry procedures wherein testing or simulation is performed at various levels of energy (e.g., $I^2t$). Generally, the data source can be software generated data, empirical data from laboratory experiments, empirical data from actual operations, theoretical data, hypothetical data, or any combination of the aforementioned data types.

The data for surface 50 is software generated data and is provided in a look up-table (Table 1), and generally represents the behavior of a 250 Amp continuous rated current limiting molded case circuit breaker:

TABLE 1

| | | X-axis: I peak (AMPS(Peak)) | | | | | | |
|---|---|---|---|---|---|---|---|---|
| Z-axis: time (ms) | | 5645 | 6129 | 6658 | 9612 | 13607 | 16485 | 19776 |
| Y-axis: | 186 | 12 | 11.5 | 11 | 10.5 | 10 | 7.8 | 5.6 |
| $I^2t$ | 207 | 11.5 | 10.925 | 10.35 | 10.025 | 9.7 | 7.25 | 4.8 |
| (AMPS$^2$Sec | 229 | 11 | 10.35 | 9.7 | 9.55 | 9.4 | 5 | 4 |
| Thousands) | 289 | 10.5 | 9.975 | 9.45 | 9.075 | 8.7 | 4.25 | 3.75 |
| | 350 | 10 | 9.6 | 9.2 | 8.6 | 8 | 4.7 | 3.5 |
| | 367 | 9.75 | 9.45 | 9.15 | 7.59 | 5 | 4.59 | 3.15 |
| | 384 | 9.5 | 9.3 | 9.1 | 6.58 | 4.06 | 3.43 | 2.8 |

Where the data source is software generated, as in Table 1, suitable programs to generate the data include those described in commonly assigned and co-pending U.S. patent application Ser. No. 09/528,175 entitled "Circuit Interruption Modeling Method and Apparatus" and U.S. patent application Ser. No. 09/528,140 entitled "Electrical Distribution Analysis Method and Apparatus", both filed on Mar. 17, 2000.

Trip response surface 50 provides robust analysis of protection devices. The three-dimensional device trip time curve shows device trip time at peak currents and associated energies. This is particularly useful when designing a protection system where the energy is of concern, such as systems employing generators, batteries with inverters, welders, motor reversal, and switching power supplies.

Figure 6:
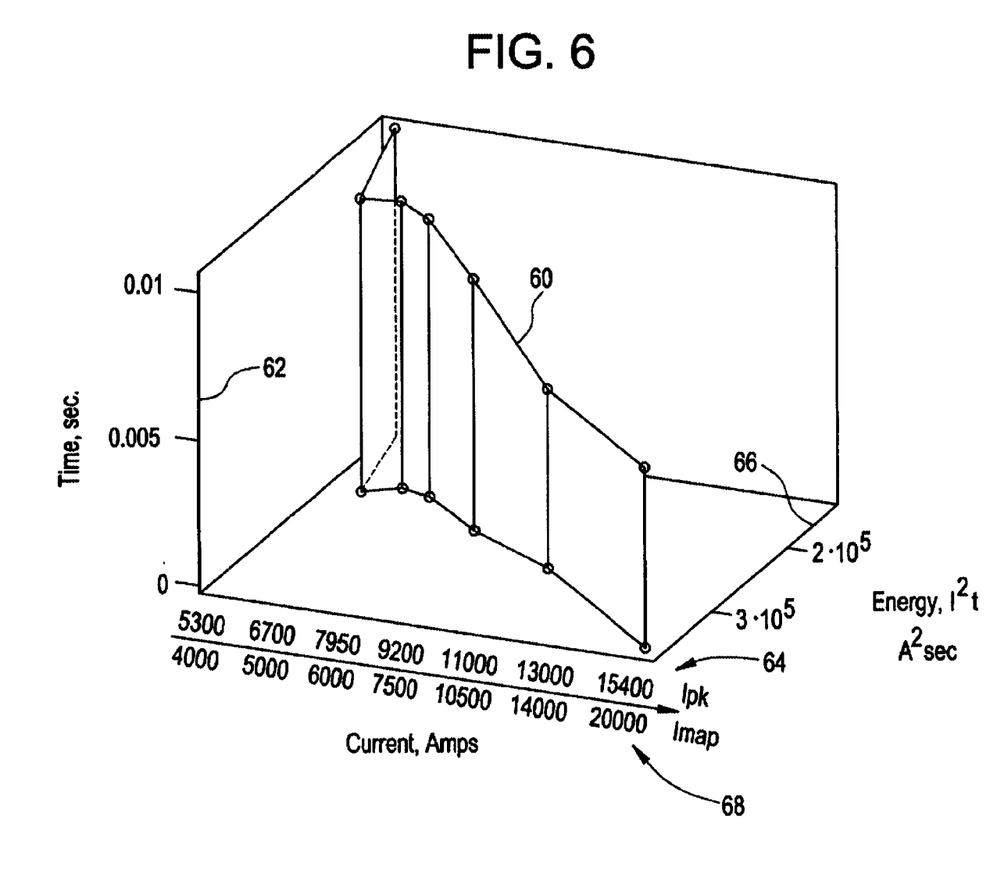
FIG. 6 is a 3-dimensional let-through surface according to another embodiment.

Referring now to FIG. 6, a device let-through surface 60 shows the clearing time of device 36 as a function of current and let-through energy as a function of current. Specifically, let-through surface 60 includes: a clearing time 62 on a y-axis as a function of a peak let-through current 64 (Ipk), in Amperes, on the x-axis; and an energy level 66, represented as $I^2t$ and expressed in Amperes$^2$·seconds, on a z-axis also as a function of peak let-through current 64. Surface 60 is generated by plotting the clearing times 62 and energies 66 for the associated peak currents 64, and interconnecting each of those points with points having the same x-axis and z-axis coordinates, and with the y-axis coordinate (time) set to zero (t=0).

The data for surface 60 is software generated and is provided in Table 2, and generally represents the behavior of a 125 Amp continuous rated current limiting molded case circuit breaker:

TABLE 2

| Peak Let-Through Current (Ipk) | Let-Through Energy ($I^2t$) Amperes$^2$ · Seconds Thousands | Clearing Time (ms) |
|---|---|---|
| 5300 | 137 | 10.56 |
| 6700 | 219 | 10 |
| 7950 | 202 | 9.75 |
| 9200 | 211 | 9.375 |
| 11000 | 248 | 8.445 |
| 13000 | 286 | 6.04 |
| 15400 | 372 | 6.08 |

Additionally, and still referring to FIG. 6, a mapping current 68 (Imap) is derived from the peak let-through currents 64, and plotted on a second x-axis scale. Generally, mapping current 64 represents the available source current which results in the associated peak let-through current 64.

Figure 7:
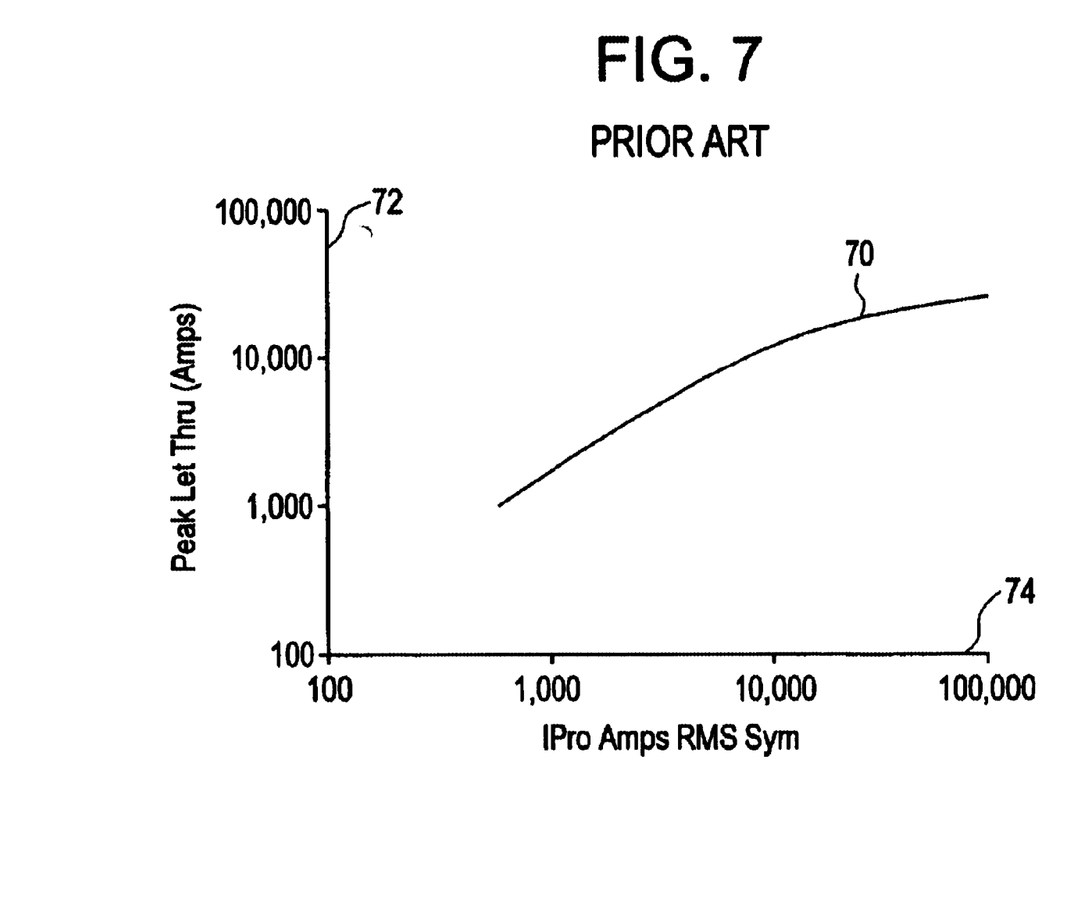
FIG. 7 is a prior art let-through curve.

The mapping current is related to the prospective current, lpro, that is typically associated with electrical source devices such as transformers. Referring now to FIG. 7, a conventional peak let-through current curve 70 displays the maximum instantaneous current, peak current 72 (Ipk), as a function of the available root mean square (RMS) symmetrical current, prospective current 74 (Ipro). Thus, the dependent variable is typically the peak current determined from the independent variable, the prospective current. The data for curve 70 is software generated data and is provided in Table 3, and generally represents the behavior of a 125 Amp continuous rated current limiting molded case circuit breaker:

TABLE 3

| Ipro (RMS Symmetrical Amperes) | Ipk (Amperes) |
|---|---|
| 584.9696 | 1000 |
| 1217.374 | 2000 |
| 1903.228 | 3000 |
| 2649.606 | 4000 |
| 3464.889 | 5000 |
| 4359.08 | 6000 |
| 5344.22 | 7000 |
| 6434.925 | 8000 |
| 7649.126 | 9000 |

TABLE 3-continued

| Ipro (RMS Symmetrical Amperes) | Ipk (Amperes) |
|---|---|
| 9009.055 | 10000 |
| 10542.62 | 11000 |
| 12285.35 | 12000 |
| 14283.17 | 13000 |
| 16596.5 | 14000 |
| 19306.49 | 15000 |
| 22524.74 | 16000 |
| 26409.02 | 17000 |
| 31189.96 | 18000 |
| 37218.55 | 19000 |
| 45056.47 | 20000 |
| 55662.06 | 21000 |
| 70815.59 | 22000 |
| 94240.91 | 23000 |
| 135253.4 | 24000 |

The peak current Ipk is treated as the independent variable to solve the inverse relationship of typical peak let-through current curves. Preferably, this is accomplished by regressing curve 70 to determine the function relating peak let-through current to the mapping current (analogous to the prospective current) for the particular device. The mapping current is used to determine what RMS symmetrical current causes an associated peak let-through current.

Using the data points in Table 3 curve 70 was regressed to the following equation: $1/Imap=A+B/Ipk$ (1), wherein A and B have the regression values as in the following Table 4:

TABLE 4

| | Value | Standard Deviation Error | t-value | 95% Confidence Limits | | P>|t| |
|---|---|---|---|---|---|---|
| A | $-6.66106 \times 10^{-5}$ | $6.57486 \times 10^{-6}$ | $-10.054399$ | $-8.3007 \times 10^{-5}$ | $4.9205 \times 10^{-5}$ | $1.7 \times 10^{-4}$ |
| B | 1.776101132 | 0.092628883 | 19.17437711 | 1.537991007 | 2.014211256 | $1 \times 10^{-5}$ |

The $R^2$ coefficient for Equation 1 having the A and B values of Table 4, as correlated to curve 70 using the data of Table 3, is 0.99442422. Other equations which also have high correlation can also be used.

Applying the Ipk values of Table 3 to Equation 1, the following mapping currents Imap are determined and shown in Table 5:

TABLE 5

| Ipk (Amperes) | Imap (RMS Symmetrical Amperes) |
|---|---|
| 5300 | 3717 |
| 6700 | 5026 |
| 7950 | 6357 |
| 9200 | 7877 |
| 11000 | 10487 |
| 13000 | 14181 |
| 15400 | 20315 |

Figure 8:
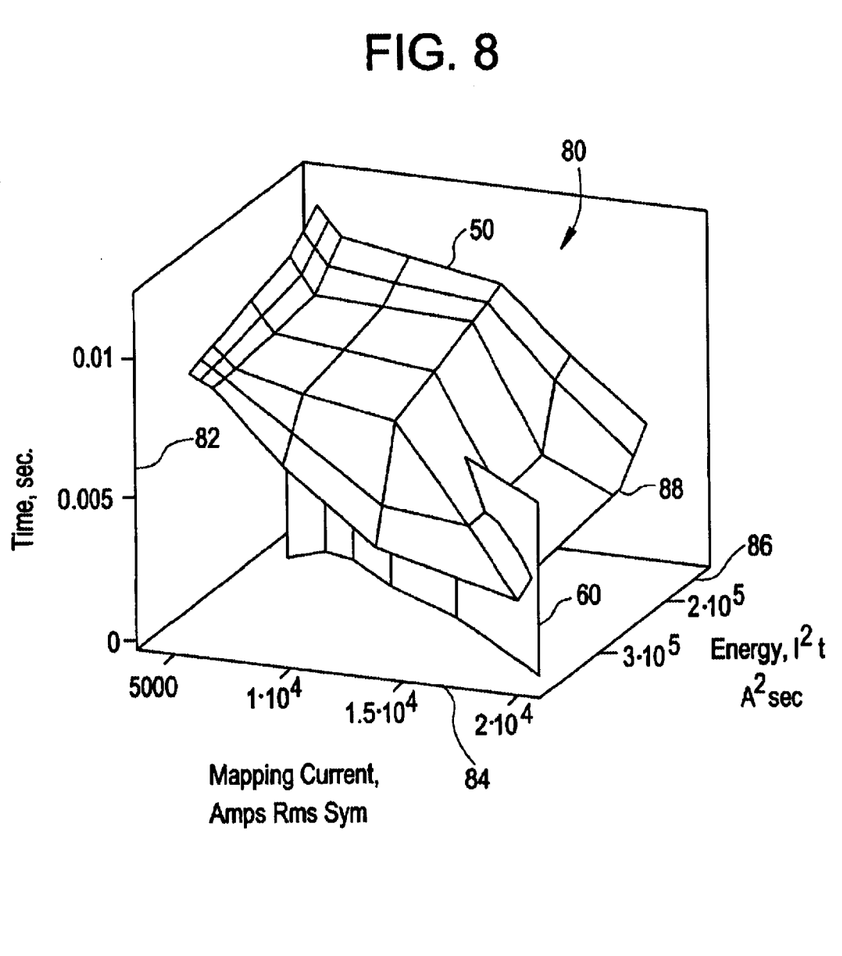
FIG. 8 is a combination of a 3-dimensional trip response surface and a 3-dimensional let-through surface useful for demonstrate selectivity.
Figure 9:
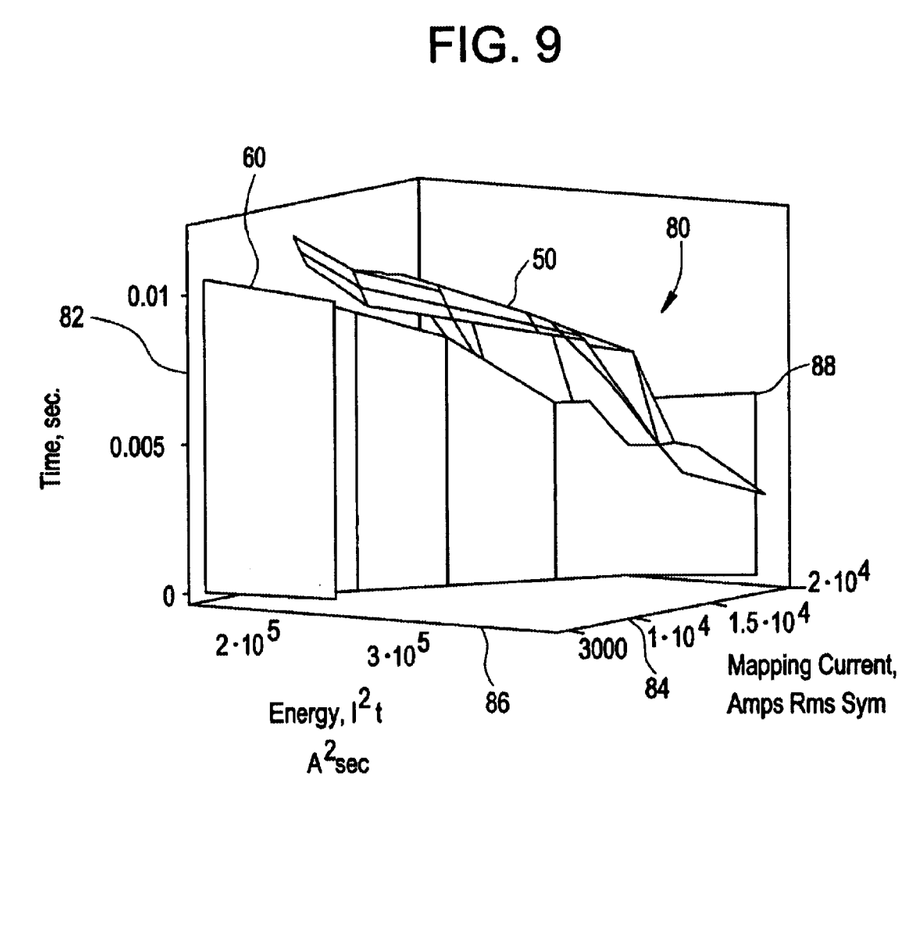
FIG. 9 is another view of the combination of surfaces in FIG. 8.

Referring now to FIGS. 8 and 9, a system 80 for demonstrating selectivity in circuit breaker systems (including, but not limited to, that generally shown above with respect to FIG. 3) is provided. System 80 generally includes trip response surface 50 (as described above with respect to FIG. 5) combines on the same axes as let-through surface 60 (as described above with respect to FIG. 6). Specifically, the axes of the 3-dimensional graph for system 80 include a time 82 on the y-axis expressed in seconds, (corresponding to the "on" time in surface 60 and the trip time in surface 50), a mapping current 84 on the x-axis expressed in RMS symmetrical Amperes, and an energy level 86 on the z-axis expressed in Amperes²·seconds.

Surface 50 in FIGS. 8 and 9 differs from surface 50 in FIG. 5 in that the current scale has been converted from the peak current values (peak current 54) generally to mapping current values, as determined, for example, with Equation 1 described above. Because of this conversion, surface 50 can be analyzed, and compared to let-through surface 60, with respect to the mapping current. This generally relays to the user of system 80 what level or source current (analogous with the prospective current) caused the peak let-through at the time and energy level shown on surface 50 in system 80. Additionally, the interpolation of the Ipk values to the Imap values allows dynamics of the downstream device 36 to influence the shape of surface 50 of upstream device 34, since the interpolation is with a function derived from characteristics of downstream device 36.

System 80 generally allows the behavior of the represented devices in series to be graphically displayed. Specifically, at regions where let-through surface 60 remains below trip response surface 50, the devices remain selective and only the downstream device trips. A selectivity limitation is illustrated at on 88 where let-through surface 60 pierces trip response surface 50. At this region, the time required for the downstream device to trip and stop the flow of current (the "on time") exceeds the response time of the upstream device, based on analysis of the characteristics of the downstream device and the interaction between the upstream device and the downstream device accounted for because of the conversion of the Ipk values to the Imap values.

The selectivity limit shown at region 88 is referred to as an "extended selectivity", since the two-tier system is analyzed without accounting for the series effect of the upstream device. However, system 80 is beneficial because of the close approximation, and since the device characteristics alone can be used to generate the overlaid surfaces 50 and 60, analysis can be expedited. Further, the interaction between the upstream device and the downstream device are partially accounted for due to the conversion of the Ipk values to the Imap values.

Figure 10:
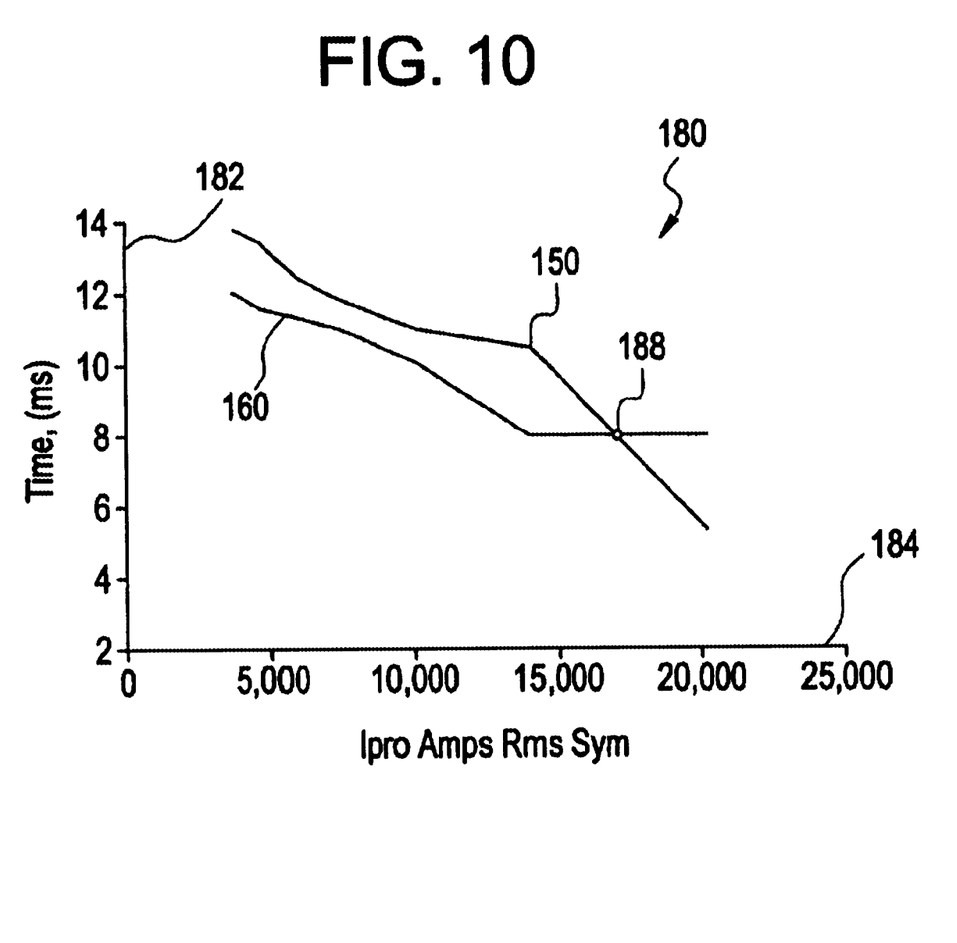
FIG. 10 is a 2-dimensional representation of the selectivity determination according to FIGS. 8 and 9.

The combination of devices plotted in FIGS. 8 and 9 are generally selective up to a prospective source current (I Pro) of about 18,000 RMS Symmetrical Amperes. Thus, 18,000 Amperes is the extended selectivity limit. This is readily seen in FIG. 10, where a system 180 for demonstrating selectivity in circuit breaker systems includes a set of 2-dimensional curves that are extracted from the 3-dimensional curves of FIGS. 8 and 9. This is particularly useful in circumstances where customers of protection devices are accustomed to viewing 2-dimensional trip response curves, as shown generally above with respect to FIG. 4 and 2-dimensional let-through current curves, as shown generally above with respect to FIG. 7.

Specifically, in system 180, the energy levels are removed leaving a time 182 on the y-axis expressed in milliseconds, and a prospective current 184 (I Pro) on the x-axis expressed in RMS symmetrical Amperes. Prospective current 184 is used in FIG. 10 in place of the mapping current, as they are analogous. System 180 includes a curve 160, which is obtained from surface 60 with the energy level data removed. Likewise, a curve 150 is obtained from surface 50 with the energy level data removed. A point 188 corresponds to the spot on trip response surface 50 in system 80 where let-through surface 60 pierces.

It will be understood that system 180 or the components thereof may be implemented at various stages in the development of the trip response surface and the let-through surface. For example, a the trip response surface and a let-through surface may be generated, combined (or overlaid) mathematically, then converted to 2-dimensional curves, without generating the 3D surfaces. Additionally, the a trip response surface and a let-through surface may be generated and overlaid (as in system 80) and then converted to 2-dimensional overlaid curves.

Figure 11:
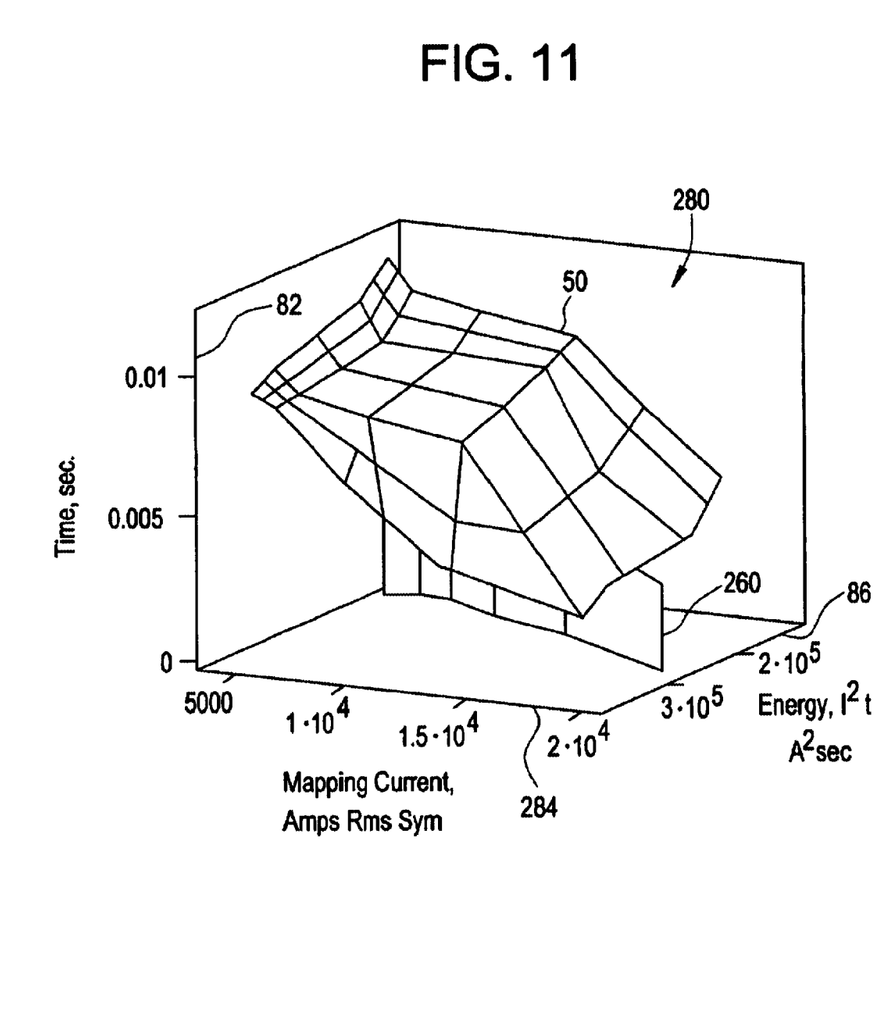
FIG. 11 is a combination of a 3-dimensional trip response surface and a 3-dimensional let-through surface to demonstrate selectivity according to another example.
Figure 12:
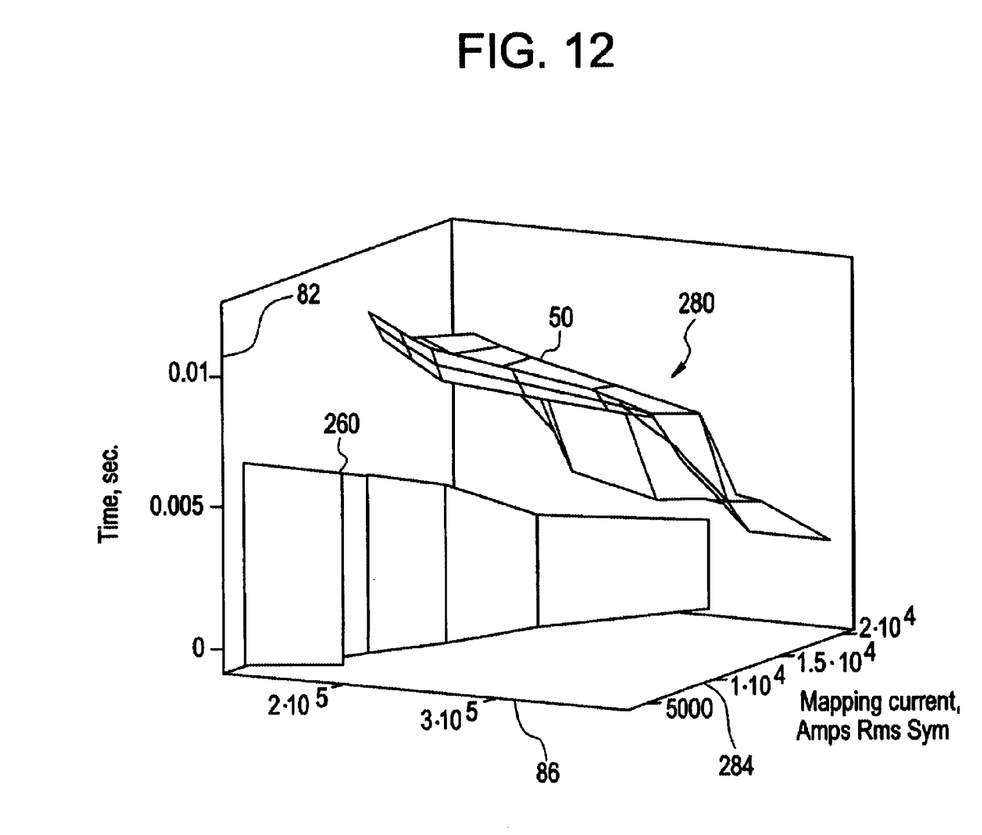
FIG. 12 is another view of the combination of surfaces in FIG. 11.

Referring now to FIGS. 11 and 12, a system 280 comprises trip response surface 50 (as described above with respect to FIG. 5) overlaid with a let-through surface 260. The time 82 is represented on the y-axis and the energy 86 is represented on the z-axis, as described with respect to the above Figures, and a mapping current 284 on the x-axis expressed in RMS symmetrical Amperes is also provided where the mapping current 284, converted as described above, with Equation 1.

The data for surface 260 generated from software generated data is provided in Table 6:

TABLE 6

| Prospective Current (Ipro) | Peak Let-Through Current (Ipk) | Let-Through Energy (I²t) Amperes² · Seconds Thousands | Clearing Time (ms) |
|---|---|---|---|
| 4000 | 5300 | 107 | 6.76 |
| 5000 | 6700 | 171 | 6.41 |
| 6000 | 7950 | 157 | 6.24 |
| 7500 | 9200 | 164 | 6.10 |
| 10500 | 11000 | 193 | 5.41 |
| 14000 | 13000 | 224 | 3.87 |
| 20000 | 15400 | 291 | 2.99 |

Table 6 generally represents the behavior of a 125A continuous rated current limiting molded case circuit breaker and includes the series effects of an upstream device, specifically a 250A continuous rated current limiting molded case circuit breaker:

The mapping function associated with the data of Table 6 is Equation 1 using the following A and B values (with corresponding regression data):

TABLE 7

|   | Value | Standard Deviation Error | t-value 95% | Confidence | Limits | P>|t| |
|---|---|---|---|---|---|---|
| A | $-6.66589 \times 10^{-5}$ | $3.22789 \times 10^{-6}$ | $-20.6292002$ | $-7.4886 \times 10^{-5}$ | $5.8291 \times 10^{-5}$ | 0 |
| B | 1.079530022 | 0.045569511 | 39.39696074 | 1.678160064 | 1.912440377 | 0 |

Let-through surface 260 accounting for the series combination of the upstream device generally has lower peak let-through current levels associated with the prospective current levels. Absolute selectivity is demonstrated, as there is no overlap or piecing between trip response surface 50 and let-through surface 260.

Figure 13:
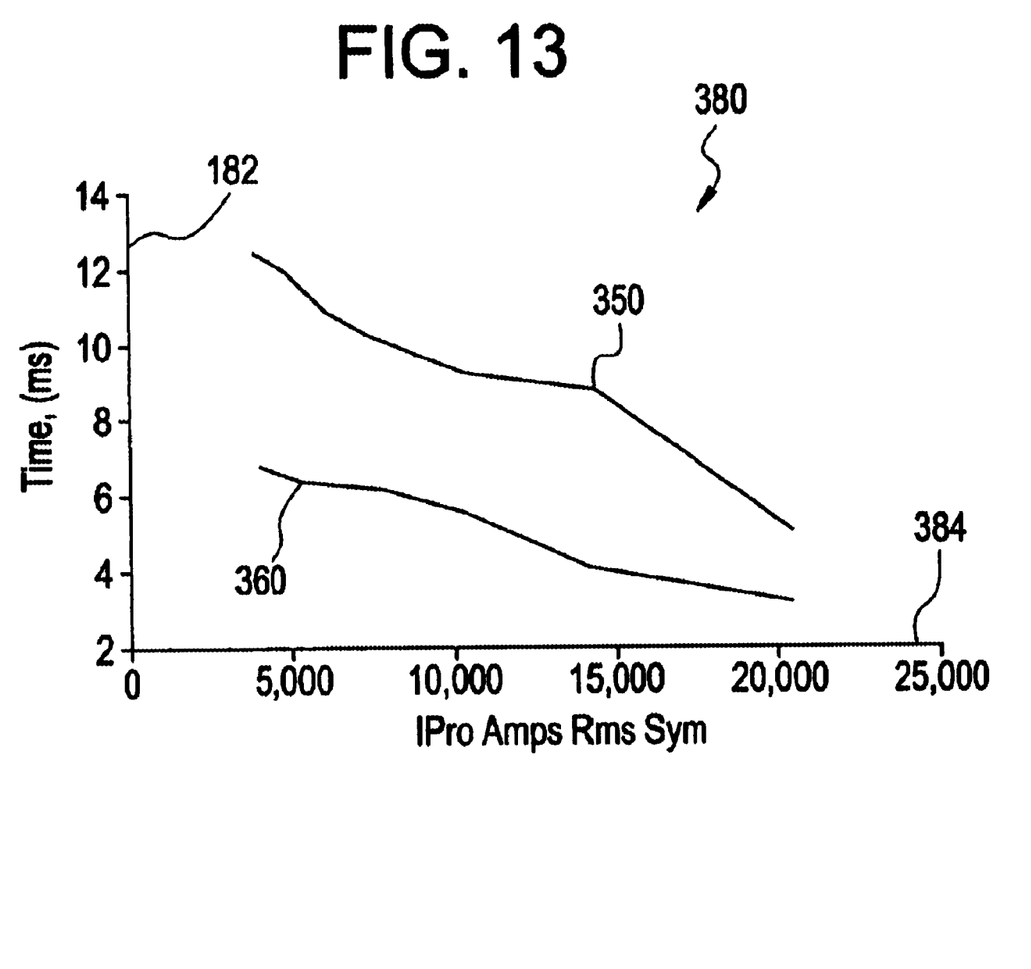
FIG. 13 is a 2-dimensional representation of the selectivity determination according to FIGS. 11 and 12.

Further, and referring now to FIG. 13, a system 380 for demonstrating selectivity in circuit breaker systems includes a set of 2-dimensional curves that are extracted from the 3-dimensional curves of FIGS. 11 and 12. System 380 is similar to system 180 described with respect to FIG. 10. The energy levels are removed, leaving time 182 on the y-axis expressed in milliseconds, and a prospective current 384 (I Pro) on the x-axis expressed in RMS symmetrical Amperes. Prospective current 384 is used in FIG. 13 in place of the mapping current, as they are analogous. Further, prospective current 384 is used in FIG. 13 rather than prospective current 184 in FIG. 10, since the scales are different due to the different mapping function. System 380 includes curve 350, which is obtained from surface 50 with the energy level data removed. Likewise, a curve 360 is obtained from surface 260 with the energy level data removed. Since curve 360 (and surface 260) account for the series effect of the upstream device, absolute selectivity is demonstrated by system 380.

The embodiments generally described herein allow dynamic selectivity to be analyzed and selective systems designed with the use of static curves. While the use of a system such as systems 280 and 380 (i.e., accounting for the series effects) are useful for demonstrating absolute selectivity, the approximations of a system such as systems 80 and 180, which may demonstrate extended selectivity only (as opposed to absolute selectivity), show that selectivity to 18,000 Amps can be achieved with this product combination where traditional techniques would only show selectivity to 2,500 Amps.

The present invention can be embodied in the form of computer-implemented processes and apparatuses for practicing those processes. The present invention can also be embodied in the form of computer program code containing instructions, embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When the implementation is on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this inventions, but that the invention will include all embodiments falling within the scope of the appended claims.

What is claimed is:

1. A method for representing trip times for a protection device comprising:
    plotting a series of trip times on a y-axis as a function of a series of current values on an x-axis;
    plotting a series of energy levels on a z-axis as a function of said series of current values on the x-axis, wherein a three-dimensional surface is generated.

2. The method as in claim 1, wherein said series of current values is a series or peak current values.

3. The method as in claim 1, wherein said series of current values is a series of mapping current value.

4. The method as in claim 1, wherein said series of current values comprises a series of peak current values and a series of mapping current values, said series of mapping current values associated with said series of peak current values.

5. The method as in claim 1, wherein said series of energy levels comprise I2t values.

6. The method as in claim 1, wherein said series of current values and said series or energy levels are derived from empirical data, theoretical data, hypothetical data, software generated data, or any combination of the foregoing data types.

7. A method for representing let-through times for a protection device comprising:
    plotting a series of clearing times on a y-axis as a function of a series of current values on an first scale of an x-axis; and
    plotting a series of energy levels on a z-axis as a function of said series current values on the x-axis, wherein a three-dimensional surface is generated.

8. The method as in claim 7, wherein said series of current values is a series of peak current values.

9. The method as in claim 8, further comprising:
    providing a second scale on said x-axis, said second scale comprising a series of mapping currents correlating to said series of peak current values.

10. The method as in claim 8, wherein said series of mapping currents is derived from an equation correlating said series of mapping currents and said series of peak currents.

11. The method as in claim 8, wherein said series of mapping currents is derived from the equation:

$$1/I\text{map} = A + B/I\text{pk}.$$

12. A method for determining selectivity in a multi-tier electrical distribution, system comprising:

plotting a series of trip limes on a y-axis as a function of a series of current values on an x-axis and plotting a series of energy levels on a z-axis as a function of said series current values on the x-axis, wherein a first three-dimensional surface is generated representing behavior of a first device; and plotting a series of clearing times on a y-axis as a function of said series of current values on said x-axis and plotting a series of energy levels on a z-axis as a function of said series of current values on the x-axis, wherein a second three-dimensional surface is generated representing behavior of a second device.

13. The method as in claim 12, wherein said series of current values is a series of mapping current values.

14. The method is in claim 13, further comprising removing said z-axis.

15. An article of manufacture comprising:

a computer usable medium having computer readable program code means embodied therein for generating a representation of trip times for a protection device the computer readable program code means in said article of manufacture comprising:

computer readable program code means for causing a computer to effect a series of trip times on a y-axis as a function of a series of current values on an x-axis and a series of energy levels on a z-axis as a function of said series of current values on the x-axis, wherein a first three-dimensional surface is generated; and computer readable program code means for causing a computer to effect a series of clearing times on a y-axis as a function of said series of current values on an first scale of an x-axis and plotting a series of energy levels on a z-axis as a function of said series of current values on the x-axis, wherein a second three-dimensional surface is generated.

16. A program storage device readable by a machine, tangibly embodying a program of instructions executable by the machine to perform method steps for determining selectivity in a multi-tier electrical distribution system, said method steps comprising:

plotting a series of trip times on a y-axis as a function of a series of current values on an x-axis and plotting a series of energy levels on a z-axis as a function of said series current values on the x-axis, wherein a first three-dimensional surface is generated; and plotting a series of clearing times on a y-axis as a function of said series of current values on an first scale of an x-axis and plotting a series of energy levels on a z-axis as a function of said series current values on the x-axis, wherein a second three-dimensional surface is generated.

* * * * *